(12) United States Patent
Meirav et al.

(10) Patent No.: US 10,675,582 B2
(45) Date of Patent: Jun. 9, 2020

(54) SYSTEMS AND METHODS FOR REGENERATING ADSORBENTS FOR INDOOR AIR SCRUBBING

(71) Applicant: ENVERID SYSTEMS, INC., Needham, MA (US)

(72) Inventors: Udi Meirav, Newton, MA (US); Israel Biran, Avilhayil (IL); Abraham Bechar, Tel-Aviv (IL)

(73) Assignee: ENVERID SYSTEMS, INC., Needham, MA (US)

( * ) Notice: Subject to any disclaimer, the term of this patent is extended or adjusted under 35 U.S.C. 154(b) by 49 days.

(21) Appl. No.: 15/933,132

(22) Filed: Mar. 22, 2018

(65) Prior Publication Data

US 2018/0207574 A1 Jul. 26, 2018

Related U.S. Application Data

(62) Division of application No. 13/945,734, filed on Jul. 18, 2013, now Pat. No. 9,950,290.
(Continued)

(51) Int. Cl.
*B01D 53/04* (2006.01)

(52) U.S. Cl.
CPC ..... *B01D 53/0438* (2013.01); *B01D 2259/40098* (2013.01); *B01D 2259/4508* (2013.01); *Y02B 30/52* (2013.01); *Y02C 20/10* (2013.01)

(58) Field of Classification Search
CPC .. B01D 2259/40098; B01D 2259/4508; B01D 53/0438; Y02B 30/52; Y02C 20/10
See application file for complete search history.

(56) References Cited

U.S. PATENT DOCUMENTS

| 1,522,480 A | 1/1925 | Allen |
| 1,836,301 A | 12/1931 | Bechthold |
| (Continued) | | |

FOREIGN PATENT DOCUMENTS

| CA | 2 640 152 A1 | 4/2010 |
| CN | 2141873 Y | 9/1993 |
| (Continued) | | |

OTHER PUBLICATIONS

International Search Report and Written Opinion for International Application No. PCT/US2013/051077, dated Dec. 20, 2013.
(Continued)

*Primary Examiner* — Cabrena Holecek
(74) *Attorney, Agent, or Firm* — Cooley LLP

(57) ABSTRACT

Some embodiments of the disclosure correspond to, for example, a system for scrubbing a mixture of gases and/or contaminants from indoor air from an enclosed space to remove at least one gas and/or contaminant from the mixture of gases and/or contaminants. The system may include one or more adsorbent materials configured to be cycled between adsorption and regeneration of at least one of gas and/or contaminant from the mixture of gases and/or contaminants via a temperature swing adsorption cycle (for example), regeneration means configured to regenerate one or more adsorbent materials. The regeneration means may be configured at a regeneration temperature to regenerate the one or more adsorbent materials.

19 Claims, 9 Drawing Sheets

Related U.S. Application Data

(60) Provisional application No. 61/814,834, filed on Apr. 23, 2013, provisional application No. 61/672,786, filed on Jul. 18, 2012.

(56) References Cited

U.S. PATENT DOCUMENTS

| | | |
|---|---|---|
| 3,042,497 A | 7/1962 | Johnson et al. |
| 3,107,641 A | 10/1963 | Haynes |
| 3,344,050 A | 9/1967 | Mayland et al. |
| 3,511,595 A | 5/1970 | Fuchs |
| 3,594,983 A | 7/1971 | Yearout |
| 3,619,130 A | 11/1971 | Ventriglio et al. |
| 3,702,049 A | 11/1972 | Morris, Jr. |
| 3,751,848 A | 8/1973 | Ahlstrand |
| 3,751,878 A | 8/1973 | Collins |
| 3,808,773 A | 5/1974 | Reyhing et al. |
| 3,885,927 A | 5/1975 | Sherman et al. |
| 3,885,928 A | 5/1975 | Wu |
| 4,182,743 A | 1/1980 | Rainer et al. |
| 4,228,197 A | 10/1980 | Means |
| 4,249,915 A | 2/1981 | Sirkar et al. |
| 4,292,059 A | 9/1981 | Kovach |
| 4,322,394 A | 3/1982 | Mezey et al. |
| 4,325,921 A | 4/1982 | Aiken et al. |
| 4,409,006 A | 10/1983 | Mattia |
| 4,433,981 A | 2/1984 | Slaugh et al. |
| 4,451,435 A | 5/1984 | Hölter et al. |
| 4,472,178 A | 9/1984 | Kumar et al. |
| 4,530,817 A | 7/1985 | Hölter et al. |
| 4,551,304 A | 11/1985 | Holter et al. |
| 4,559,066 A | 12/1985 | Hunter et al. |
| 4,711,645 A | 12/1987 | Kumar et al. |
| 4,810,266 A | 3/1989 | Zinnen |
| 4,816,043 A | 3/1989 | Harrison |
| 4,863,494 A | 9/1989 | Hayes |
| 4,892,719 A | 1/1990 | Gesser |
| 4,917,862 A | 4/1990 | Kraw et al. |
| 4,987,952 A | 1/1991 | Beal et al. |
| 5,046,319 A | 9/1991 | Jones |
| 5,087,597 A | 2/1992 | Leal et al. |
| 5,109,916 A | 5/1992 | Thompson |
| 5,137,548 A | 8/1992 | Grenier et al. |
| 5,149,343 A | 9/1992 | Sowinski |
| 5,186,903 A | 2/1993 | Cornwell |
| 5,194,158 A | 3/1993 | Matson |
| 5,221,520 A | 6/1993 | Cornwell |
| 5,231,063 A | 7/1993 | Fukumoto et al. |
| 5,281,254 A | 1/1994 | Birbara et al. |
| 5,290,345 A | 3/1994 | Osendorf et al. |
| 5,292,280 A | 3/1994 | Janu et al. |
| 5,322,473 A | 6/1994 | Hofstra et al. |
| 5,352,274 A | 10/1994 | Blakley |
| 5,376,614 A | 12/1994 | Birbara et al. |
| 5,389,120 A | 2/1995 | Sewell et al. |
| 5,407,465 A | 4/1995 | Schaub et al. |
| 5,464,369 A | 11/1995 | Federspiel |
| 5,492,683 A | 2/1996 | Birbara et al. |
| 5,584,916 A | 12/1996 | Yamashita et al. |
| 5,614,000 A | 3/1997 | Kalbassi et al. |
| 5,646,304 A | 7/1997 | Acharya et al. |
| 5,672,196 A | 9/1997 | Acharya et al. |
| 5,675,979 A | 10/1997 | Shah |
| 5,702,505 A | 12/1997 | Izumi et al. |
| 5,707,005 A | 1/1998 | Kettler et al. |
| 5,827,355 A | 10/1998 | Wilson |
| 5,869,323 A | 2/1999 | Horn |
| 5,876,488 A | 3/1999 | Birbara et al. |
| 5,904,896 A | 5/1999 | High |
| 5,948,355 A | 9/1999 | Fujishima et al. |
| 5,964,927 A | 10/1999 | Graham et al. |
| 5,984,198 A | 11/1999 | Bennett et al. |
| 6,024,781 A | 2/2000 | Bülow et al. |
| 6,027,550 A | 2/2000 | Vickery |
| 6,102,793 A | 8/2000 | Hansen |
| 6,113,674 A | 9/2000 | Graham et al. |
| 6,120,581 A | 9/2000 | Markovs et al. |
| 6,123,617 A | 9/2000 | Johnson |
| 6,187,596 B1 | 2/2001 | Dallas et al. |
| 6,254,763 B1 | 7/2001 | Izumi et al. |
| 6,280,691 B1 | 8/2001 | Homeyer et al. |
| 6,364,938 B1 | 4/2002 | Birbara et al. |
| 6,375,722 B1 | 4/2002 | Henderson et al. |
| 6,402,809 B1 | 6/2002 | Monereau et al. |
| 6,428,608 B1 | 8/2002 | Shah et al. |
| 6,432,367 B1 | 8/2002 | Munk |
| 6,432,376 B1 | 8/2002 | Choudhary et al. |
| 6,533,847 B2 | 3/2003 | Seguin et al. |
| 6,547,854 B1 | 4/2003 | Gray et al. |
| 6,605,132 B2 | 8/2003 | Fielding |
| 6,623,550 B2 | 9/2003 | Dipak et al. |
| 6,711,470 B1 | 3/2004 | Hartenstein et al. |
| 6,726,558 B1 | 4/2004 | Meirav |
| 6,773,477 B2 | 8/2004 | Lindsay |
| 6,796,896 B2 | 9/2004 | Laiti |
| 6,797,246 B2 | 9/2004 | Hopkins |
| 6,866,701 B2 | 3/2005 | Meirav |
| 6,908,497 B1 | 6/2005 | Sirwardane |
| 6,916,239 B2 | 7/2005 | Siddaramanna et al. |
| 6,916,360 B2 | 7/2005 | Seguin et al. |
| 6,930,193 B2 | 8/2005 | Yaghi et al. |
| 6,964,692 B2 | 11/2005 | Gittleman et al. |
| 6,974,496 B2 | 12/2005 | Wegeng et al. |
| 7,288,136 B1 | 10/2007 | Gray et al. |
| 7,407,533 B2 | 8/2008 | Steins |
| 7,407,633 B2 | 8/2008 | Potember et al. |
| 7,449,053 B2 | 11/2008 | Hallam |
| 7,472,554 B2 | 1/2009 | Vosburgh |
| 7,645,323 B2 | 1/2010 | Massenbauer-Strafe et al. |
| 7,662,746 B2 | 2/2010 | Yaghi et al. |
| 7,666,077 B1 | 2/2010 | Thelen |
| 7,802,443 B2 | 9/2010 | Wetzel |
| 7,846,237 B2 | 12/2010 | Wright et al. |
| 7,891,573 B2 | 2/2011 | Finkam et al. |
| 8,157,892 B2 | 4/2012 | Meirav |
| 8,210,914 B2 | 7/2012 | McMahan et al. |
| 8,317,890 B2 | 11/2012 | Raether et al. |
| 8,398,753 B2 | 3/2013 | Sergi et al. |
| 8,491,710 B2 | 7/2013 | Meirav |
| 8,690,999 B2 | 4/2014 | Meirav et al. |
| 8,734,571 B2 | 5/2014 | Golden et al. |
| 9,316,410 B2 | 4/2016 | Meirav et al. |
| 9,328,936 B2 | 5/2016 | Meirav et al. |
| 9,399,187 B2 | 7/2016 | Meirav et al. |
| 9,566,545 B2 | 2/2017 | Meirav et al. |
| 9,802,148 B2 | 10/2017 | Meirav et al. |
| 9,919,257 B2 | 3/2018 | Meirav et al. |
| 9,939,163 B2 | 4/2018 | Meirav et al. |
| 9,950,290 B2 | 4/2018 | Meirav et al. |
| 9,976,760 B2 | 5/2018 | Meirav et al. |
| 9,987,584 B2 | 6/2018 | Meirav et al. |
| 10,046,266 B2 | 8/2018 | Meirav et al. |
| 10,086,324 B2 | 10/2018 | Meirav |
| 10,281,168 B2 | 5/2019 | Meirav et al. |
| 10,525,401 B2 | 1/2020 | Meirav et al. |
| 2001/0021363 A1 | 9/2001 | Poles et al. |
| 2001/0054415 A1 | 12/2001 | Hanai et al. |
| 2002/0056373 A1 | 5/2002 | Fielding |
| 2002/0078828 A1 | 6/2002 | Kishkovich et al. |
| 2002/0083833 A1 | 7/2002 | Nalette et al. |
| 2002/0147109 A1 | 10/2002 | Branover et al. |
| 2002/0183201 A1 | 12/2002 | Barnwell et al. |
| 2002/0193064 A1 | 12/2002 | Michalakos et al. |
| 2003/0037672 A1 | 2/2003 | Sircar |
| 2003/0097086 A1 | 5/2003 | Gura |
| 2003/0188745 A1 | 10/2003 | Deas et al. |
| 2004/0005252 A1 | 1/2004 | Siess |
| 2004/0020361 A1 | 2/2004 | Pellegrin |
| 2004/0069144 A1 | 4/2004 | Wegeng et al. |
| 2004/0118287 A1 | 6/2004 | Jaffe et al. |
| 2005/0133196 A1 | 6/2005 | Gagnon et al. |
| 2005/0147530 A1 | 7/2005 | Kang et al. |
| 2005/0191219 A1 | 9/2005 | Uslenghi et al. |
| 2005/0262869 A1 | 12/2005 | Tongu et al. |

(56) References Cited

U.S. PATENT DOCUMENTS

| | | |
|---|---|---|
| 2005/0284291 A1 | 12/2005 | Alizadeh-Khiavi et al. |
| 2005/0288512 A1 | 12/2005 | Butters et al. |
| 2006/0032241 A1 | 2/2006 | Gontcharov et al. |
| 2006/0054023 A1 | 3/2006 | Raetz et al. |
| 2006/0079172 A1 | 4/2006 | Fleming et al. |
| 2006/0112708 A1 | 6/2006 | Reaves |
| 2006/0148642 A1 | 7/2006 | Ryu et al. |
| 2006/0225569 A1 | 10/2006 | Schmidt et al. |
| 2006/0249019 A1 | 11/2006 | Roychoudhury et al. |
| 2008/0119356 A1 | 3/2008 | Ryu et al. |
| 2008/0078289 A1 | 4/2008 | Sergi et al. |
| 2008/0127821 A1 | 6/2008 | Noack et al. |
| 2008/0135060 A1 | 6/2008 | Kuo et al. |
| 2008/0173035 A1 | 7/2008 | Thayer et al. |
| 2008/0182506 A1 | 7/2008 | Jackson et al. |
| 2008/0210768 A1 | 9/2008 | You |
| 2008/0216653 A1 | 9/2008 | Paton-Ash et al. |
| 2008/0293976 A1 | 11/2008 | George et al. |
| 2009/0000621 A1 | 1/2009 | Haggblom et al. |
| 2009/0071062 A1 | 3/2009 | Hedman |
| 2009/0120288 A1 | 5/2009 | Lackner et al. |
| 2009/0188985 A1 | 7/2009 | Scharing et al. |
| 2009/0220388 A1 | 9/2009 | Monzyk et al. |
| 2009/0260372 A1* | 10/2009 | Skinner .............. B01D 53/0438 62/93 |
| 2010/0076605 A1 | 3/2010 | Harrod et al. |
| 2010/0154636 A1 | 6/2010 | Liu et al. |
| 2010/0224565 A1 | 9/2010 | Dunne et al. |
| 2010/0254868 A1 | 10/2010 | Obee et al. |
| 2010/0262298 A1 | 10/2010 | Johnson et al. |
| 2010/0275775 A1 | 11/2010 | Griffiths et al. |
| 2010/0278711 A1 | 11/2010 | Find |
| 2011/0064607 A1 | 3/2011 | Hedman |
| 2011/0079143 A1 | 4/2011 | Marotta et al. |
| 2011/0085933 A1 | 4/2011 | Mazyek et al. |
| 2011/0146494 A1 | 6/2011 | Desai et al. |
| 2011/0179948 A1 | 7/2011 | Choi et al. |
| 2011/0189075 A1 | 8/2011 | Wright et al. |
| 2011/0192172 A1 | 8/2011 | Delacruz |
| 2011/0206572 A1 | 8/2011 | McKenna et al. |
| 2011/0250121 A1 | 10/2011 | Schmidt |
| 2011/0262327 A1 | 10/2011 | Dillon et al. |
| 2011/0265648 A1 | 11/2011 | Meirav |
| 2011/0269919 A1 | 11/2011 | Min et al. |
| 2011/0277490 A1 | 11/2011 | Meirav |
| 2011/0296872 A1 | 12/2011 | Eisenberger |
| 2012/0004092 A1 | 1/2012 | Raatschen et al. |
| 2012/0012005 A1 | 1/2012 | Burke |
| 2012/0052786 A1 | 3/2012 | Clawsey |
| 2012/0076711 A1 | 3/2012 | Gebald et al. |
| 2012/0129267 A1 | 5/2012 | Daly |
| 2012/0137876 A1 | 6/2012 | Miller |
| 2012/0148858 A1 | 6/2012 | Wu |
| 2012/0152116 A1 | 6/2012 | Barclay et al. |
| 2012/0168113 A1 | 7/2012 | Karamanos |
| 2012/0216676 A1 | 8/2012 | Addiego et al. |
| 2012/0222500 A1 | 9/2012 | Riess et al. |
| 2012/0271460 A1 | 10/2012 | Rognili |
| 2012/0272966 A1 | 11/2012 | Ando et al. |
| 2012/0311926 A1 | 12/2012 | Mittelmark |
| 2012/0321511 A1 | 12/2012 | Lorcheim |
| 2013/0052113 A1 | 2/2013 | Molins et al. |
| 2013/0291732 A1 | 11/2013 | Meirav |
| 2013/0331021 A1 | 12/2013 | Rodell |
| 2014/0242708 A1 | 8/2014 | Lundgren |
| 2014/0298996 A1 | 10/2014 | Meirav et al. |
| 2015/0078964 A1 | 3/2015 | Meirav et al. |
| 2016/0271556 A1 | 9/2016 | Okano |
| 2016/0363333 A1 | 12/2016 | Meirav et al. |
| 2018/0147526 A1 | 5/2018 | Meirav et al. |
| 2018/0187907 A1 | 7/2018 | Meirav et al. |
| 2018/0236396 A1 | 8/2018 | Meirav et al. |
| 2018/0264396 A1 | 9/2018 | Meirav et al. |
| 2018/0339261 A1 | 11/2018 | Meirav et al. |
| 2018/0339262 A1 | 11/2018 | Perl-Olshvang et al. |
| 2019/0143258 A1 | 5/2019 | Meirav et al. |
| 2019/0186762 A1 | 6/2019 | Meirav et al. |
| 2019/0247782 A1 | 8/2019 | Meirav et al. |
| 2019/0262761 A1 | 8/2019 | Meirav |
| 2019/0299154 A1 | 10/2019 | Meirav et al. |
| 2019/0344211 A1 | 11/2019 | Meirav et al. |
| 2019/0346161 A1 | 11/2019 | Meirav et al. |

FOREIGN PATENT DOCUMENTS

| | | |
|---|---|---|
| CN | 2612444 Y | 4/2004 |
| CN | 2729562 Y | 9/2005 |
| CN | 1872388 A | 12/2006 |
| CN | 101001767 A | 7/2007 |
| CN | 101072620 A | 11/2007 |
| CN | 101199913 A | 6/2008 |
| CN | 101444693 A | 6/2009 |
| CN | 101500704 A | 8/2009 |
| CN | 101564634 A | 10/2009 |
| CN | 201363833 Y | 12/2009 |
| CN | 201618493 U | 11/2010 |
| CN | 102233217 A | 11/2011 |
| CN | 202032686 U | 11/2011 |
| CN | 202270445 U | 6/2012 |
| CN | 103119376 A | 5/2013 |
| DE | 102006048716 B3 | 2/2008 |
| EP | 0 475 493 A2 | 3/1992 |
| EP | 2 465 596 A1 | 6/2012 |
| ES | 2 387 791 A1 | 10/2012 |
| JP | 56-158126 A | 12/1981 |
| JP | 59-225232 A | 12/1984 |
| JP | 60-194243 A | 10/1985 |
| JP | 02-092373 A | 4/1990 |
| JP | 03-207936 A | 9/1991 |
| JP | 05-161843 A | 6/1993 |
| JP | 06-031132 A | 2/1994 |
| JP | 08-114335 A | 5/1996 |
| JP | 09-085043 A | 3/1997 |
| JP | 2000-291978 A | 10/2000 |
| JP | 2001-170435 A | 6/2001 |
| JP | 2001-232127 A | 8/2001 |
| JP | 3207936 B2 | 9/2001 |
| JP | 2005-090941 A | 4/2005 |
| JP | 2006-275487 A | 10/2006 |
| JP | 2009-150623 A | 7/2009 |
| JP | 2009-202137 A | 9/2009 |
| JP | 2010-149086 A | 7/2010 |
| WO | WO 1988/005693 A1 | 8/1988 |
| WO | WO 02/08160 A1 | 1/2002 |
| WO | WO 02/12796 A2 | 2/2002 |
| WO | WO 2006/016345 A1 | 2/2006 |
| WO | WO 2007/128584 A1 | 11/2007 |
| WO | WO 2008/155543 A2 | 12/2008 |
| WO | WO 2009/126607 A2 | 10/2009 |
| WO | WO 2010/091831 A1 | 8/2010 |
| WO | WO 2010/124388 A1 | 11/2010 |
| WO | WO 2011/114168 A1 | 9/2011 |
| WO | WO 2011/146478 A1 | 11/2011 |
| WO | WO 2012/071475 A1 | 5/2012 |
| WO | WO 2012/100149 A1 | 7/2012 |
| WO | WO 2012/120173 A1 | 9/2012 |
| WO | WO 2012/134415 A1 | 10/2012 |
| WO | WO 2012/145303 A2 | 10/2012 |
| WO | WO 2012/152930 A1 | 11/2012 |
| WO | WO 2012/158911 | 11/2012 |
| WO | WO 2013/012622 A1 | 1/2013 |
| WO | WO 2013/074973 A1 | 5/2013 |
| WO | WO 2013/106573 A1 | 7/2013 |
| WO | WO 2014/015138 A2 | 1/2014 |
| WO | WO 2014/047632 A1 | 3/2014 |
| WO | WO 2014/078708 A1 | 5/2014 |
| WO | WO 2014/153333 A1 | 9/2014 |
| WO | WO 2014/176319 A1 | 10/2014 |

OTHER PUBLICATIONS

International Search Report for International Application No. PCT/US2012/038343, dated Jan. 28, 2013.

(56) References Cited

OTHER PUBLICATIONS

Search Report, dated Dec. 7, 2015, for Chinese Patent Application No. 201380037709.2.
Gesser, H.D., "The Reduction of Indoor Formaldehyde Gas and that Emanating from Urea Formaldehyde Foam Insulation," Environmental International, 10:305-308 (1984).
Goeppert, A. et al., "Carbon Dioxide Capture from the Air Using a Polyamine Based Regenerable Solid Adsorbent," J. Am. Chem. Soc., 133:20164-20167 (2011).
Gray, M.L. et al., "Performance of immobilized tertiary amine solid sorbents for the capture of carbon dioxide," International Journal of Greenhouse Gas Control, 2:3-8 (2008).
Jones, C.W., "$CO_2$ Capture from Dilute Gases as a Component of Modern Global Carbon Management," Annu. Rev. Chem. Biomol. Eng., 2:31-52 (2011).
Ma, C. et al., "Removal of low-concentration formaldehyde in air by adsorption on activated carbon modified by hexamethylene diamine," Carbon, 49:2873-2875 (2011).
Nuckols, M. L. et al., Technical Manual: Design Guidelines for Carbon Dioxide Scrubbers. Naval Coastal Systems Center, Ncsc Tech Man 4110, Revision A, Jul. 1985, 10 pp.
Serna-Guerrero, R. et al., "Triamine-grafted pore-expanded mesoporous silica for $CO_2$ capture: Effect of moisture and adsorbent regeneration strategies," Adsorption, 16:567-575 (2010).
Sidheswaran, M.A. et al., "Energy efficient indoor VOC air cleaning with activated carbon filter (ACF) filters," Building and Environment, 47:357-367 (2012).
United States Environmental Protection Agency, "Carbon Adsorption for Control of VOC Emissions: Theory and Full Scale System Performance", EPA-450/3-88-012, Jun. 1988, 84 pages.
United States Environmental Protection Agency, "EPA Ventilation and Air Quality in Offices, Fact Sheet" Air and Radiation (6609J), 402-F-94-003, Revised Jul. 1990, 4 pages.
ZORFLEX® ACC, 100% Activated Woven Carbon Cloth. Calgon Carbon Corporation, 2008, www.calgoncarbon.com, 2 pages.
Zorflex® ACC, 100% Activated Woven Carbon Cloth, Calgon Carbon Corporation, 2011, www.calgoncarbon.com, 2 pages.
Non-Final Office Action, dated May 19, 2016, for U.S. Appl. No. 13/945,734, 13 pages.
Final Office Action, dated Jun. 15, 2017, for U.S. Appl. No. 13/945,734, 25 pages.
Notice of Allowance, dated Dec. 20, 2017, for U.S. Appl. No. 13/945,734, 8 pages.
Chinese Application No. 201380037709.2: English translation of Second Office Action, dated Oct. 17, 2016, 17 pages.
Chinese Application No. 201380037709.2: English translation of Third Office Action, dated Aug. 2, 2017, 4 pages.
Chinese Application No. 201380037709.2: English translation of Fourth Office Action, dated Jan. 2, 2018, 3 pages.
International Preliminary Report on Patentability, dated Jan. 20, 2015, for PCT/US2013/051077, 13 pages.

\* cited by examiner

SYSTEMS AND METHODS FOR REGENERATING ADSORBENTS FOR INDOOR AIR SCRUBBING

CROSS REFERENCE TO RELATED APPLICATIONS

This application is a divisional of and claims priority to U.S. patent application Ser. No. 13/945,734, filed Jul. 18, 2013 and entitled "Systems And Methods For Regenerating Adsorbents For Indoor Air Scrubbing", which in turns claims priority to: U.S. Provisional Patent Application No. 61/672,786, filed Jul. 18, 2012 and entitled "Application of Heat Pumps for Regenerating Sorbents Used in Indoor Air Scrubbing"; U.S. Provisional Patent Application No. 61/814,834, filed Apr. 23, 2013 and entitled "Application of Heat Pumps for Regenerating Sorbents Used in Indoor Air Scrubbing". The disclosures of the above applications are incorporated herein by reference in their entireties.

TECHNICAL FIELD

Embodiments of the present disclosure generally relate to air management systems and particularly to air management systems including heat pumps and the like for regenerating an adsorbent used for indoor air scrubbing.

BACKGROUND

Air management systems including Heating, Ventilation and Air-Conditioning ("HVAC") are standard in virtually every modern enclosed space, such as inter alia a building, vehicle or vessel. One of the goals of HVAC systems is to provide a comfortable and healthy environment for the enclosed space occupants, in terms of temperature, humidity, composition and cleanliness of the indoor air. Additionally, HVAC systems allow control of the substance concentration for maintaining the indoor air at a desired degree, thereby ensuring good air quality.

Indoor air within and around enclosed spaces is affected by a plurality of substances, comprising contaminants or pollutants. Among these contaminants are carbon dioxide ($CO_2$), carbon monoxide, nitrous oxides, sulfur oxides and radon and other inorganic gases as well as a broad class of organic gases and vapors, referred to as Volatile Organic Compounds (VOCs). Particles and microorganisms also represent non-gaseous contaminants that affect indoor air quality and should be filtered or removed. These contaminants are often generated inside the building by its occupants, systems and content. In order to maintain good air quality, HVAC systems are typically configured to replace indoor air with outdoor air or, alternatively, to allow the air to flow through air scrubbers. Outdoor air may be air from out of the enclosed space.

Some adsorbent based scrubbers may be used for extended periods of time by undergoing a repeated cycle of adsorption and so-called regeneration. Adsorption and corresponding regeneration may be accomplished, for example, via a temperature swing adsorption cycle. Normally, once an adsorbent, i.e. an adsorbent material, becomes saturated with contaminants, it loses its adsorption capacity. However, regeneration is achieved under appropriate conditions where the contaminants that have been captured by the adsorbent are released and purged, allowing the adsorbent to regain its adsorptive properties. Regeneration can be facilitated by a combination of heat and a flow of a relatively clean purging gas, which can be outdoor air, for example.

SUMMARY OF DISCLOSURE

In some embodiments of the present disclosure, systems and methods are described for regenerating an adsorbent utilized for indoor air scrubbing, using, for example, a heat pump to minimize the energy cost or consumption for delivering warm purge gas (which may also be referred to as a regeneration gas) used in regeneration. In some embodiments, the heat pump can be configured for superiorly efficient operation by having its cooling side exposed to an incidental source of heat or warm air, or by having its cooling side remove heat from indoor air itself, thus offsetting some of the cooling load and energy consumption of one or more air-conditioning or air-treatment components, systems or units. Hot refrigerant from the heat pump's condenser can be diverted to heat the purge gas. Multiple scrubbers can be configured to share a single heat pump using intelligent multiplexing. In some embodiments, the hot refrigerant may be used to directly heat the adsorbent for regeneration thereof.

In accordance with some embodiments, a system is provided for scrubbing a mixture of gases, e.g., indoor air of an enclosed space, so as to remove at least one gas and/or at least one contaminant from the indoor air. The system may include one or more adsorbent materials which may be configured to be cycled between adsorption and regeneration (via, for example, temperature swing adsorption cycle). In regeneration, it may be referred to as purging of the at least one of gas and/or contaminant from the adsorbent during a regeneration cycle. The system may include regeneration means configured to regenerate one or more adsorbent materials at a regeneration temperature; such means may be a heat pump which may be configured to heat a purge gas and/or the adsorbent materials (e.g., directly). In some embodiments, the regeneration means may be at least one of the heat pump, conduits and fans and valves for directing a purging airflow to/over/through (e.g., at least one of) the adsorbent materials, the purging airflow (e.g., at an elevated temperature relative to the adsorbent materials), and a heat source to heat at least one of the purging airflow and/or the one or more adsorbent materials (e.g., the heat pump); in some embodiments, the regeneration means may be a plurality of the foregoing, and in some embodiments, all of the foregoing.

In accordance with some embodiments, the enclosed space may include, inter cilia, a building, a house, a vehicle, or a vessel. The gases and/or contaminants may be selected from the group consisting of carbon dioxide, volatile organic compounds, sulfur oxides, radon, nitrous oxides and carbon monoxide. The purge gas may include outdoor air, and the system may further include an outdoor air inlet configured to receive the outdoor air at an outdoor air temperature. In some embodiments, the received outdoor air may be heated directly or indirectly by the heat pump to a regeneration temperature for regenerating the adsorbent(s). The regeneration temperature may be at least about 10° C. greater than the outdoor air temperature.

In accordance with some embodiments, the heat pump may be configured to remove heat from the indoor air and concurrently heat the purge gas for regenerating the adsorbent materials. The removing of heat from the indoor air may result in a reduction of the cooling load of the enclosed space. The reduction of the cooling load of the enclosed space may approximately offset the energy consumption of the heat pump.

In accordance with some embodiments, the heat pump may be configured to remove heat from a source of warm air. The source of warm air may include at least one of a chiller, a compressor, a cooling tower, a generator, a solar heater, and a furnace. The enclosed space may include an HVAC system having circulating airflow in the enclosed space, and wherein the system may be configured to intercept a portion of the airflow. The portion may be less than about 20%.

In accordance with some embodiments, an evaporator side of the heat pump may be in thermal communication with circulating, indoor air. The heat pump may be a heat pump within an HVAC system. The heat pump may include a refrigerant such that a portion of the refrigerant, in its warm (i.e., elevated temperature) state, may be diverted to flow through an element that delivers heat to the purge gas or the one or more adsorbent materials. Less than about 50% of the refrigerant flow may be diverted to heat at least one of the purge gas and the one or more adsorbent materials. In some embodiments, less than about 20% of the refrigerant flow may be diverted to heat at least one of the purge gas and the one or more adsorbent materials.

In accordance with some embodiments, the system may be a computer implemented system for controlling a system for regenerating an adsorbent for indoor air. Such a system may include a control system (e.g., computer, processor, and the like) which may be configured for controlling delivery of heat by the heat pump to the one or more adsorbent materials in coordination with, for example, the adsorbent materials' adsorption-regeneration cycle (via, for example, the temperature swing adsorption cycle).

In accordance with some embodiments, the system may include one or more of:
  a scrubber including the one or more adsorbent materials,
  a plurality of scrubbers including the one or more adsorbent materials;
  one or more (or a single) heat pumps configured to provide heat to one or more scrubbers;
  a network of conduits configured for delivering heat from the heat pump to the one or more scrubbers; and/or
  a control system configured for controlling coordination of the heat pump, network of conduits and/or the one or more scrubbers so that regeneration heat may be available to each scrubber when it is required for regeneration.

In accordance with some embodiments, the control system may control coordination of at least one of the heat pump, network of conduits and one or more scrubbers, according to at least one of the following parameters:
  an occupancy level of one or more areas in the enclosed space;
  a level of the at least one of gas and/or contaminant contained in indoor air circulating in the one or more areas of the enclosed space;
  a level of the at least one of gas and/or contaminant accumulated in the one or more adsorbent materials;
  a level of the at least one of gas and/or contaminant in air exiting at least one of the more than one scrubber; and/or
  an indoor air temperature and/or an indoor air humidity level, an outdoor air temperature and/or an outdoor air humidity level, and a preset schedule.

In accordance with some embodiments, there is provided a method for scrubbing at least a portion of a mixture of gases of an indoor airflow from an enclosed space, the scrubbing for removing at least one gas and/or contaminant from the mixture of gases and/or contaminants, the method including at least one, and in some embodiments a plurality, and in some embodiments, all of the following steps:
  providing a scrubber system having one or more adsorbent materials;
  providing regeneration means configured to regenerate the one or more adsorbent materials, the means comprising or including a purge gas configured to regenerate the one or more adsorbent materials;
  providing thermal communication between a heat pump and the purge gas;
  scrubbing the indoor air by flowing at least a portion of the purge gas over the one or more adsorbent materials,
  heating the purge gas or the one or more adsorbent materials with the heat pump; and/or
  periodically regenerating the one or more adsorbent materials via the regeneration means by, for example, flowing at least one of the heated purge gas to, over and/or through the one or more adsorbent materials, and/or the purge gas over and/or through the heated one or more adsorbent materials (for example), during a regeneration cycle for a predetermined period of time.

In accordance with some embodiments, the gases and/or contaminants may be selected from the group consisting of carbon dioxide, volatile organic compounds, sulfur oxides, radon, nitrous oxides and carbon monoxide. The purge gas may include outdoor air, and, accordingly, the method may further include providing an outdoor air inlet configured to receive the outdoor air at an outdoor air temperature. In some embodiments, the received outdoor air may be heated directly and/or indirectly by the heat pump to a regeneration temperature for regenerating the adsorbent(s). The regeneration temperature may be at least about 10° C. greater than the outdoor air temperature (for example).

In accordance with some embodiments, the heat pump utilized in scrubber embodiments may be configured to remove heat from the indoor air and concurrently heat the purge gas. The removing of heat from the indoor air may result in a reduction of the cooling load of the enclosed space. The reduction of the cooling load of the enclosed space may approximately offset the energy consumption of the heat pump.

In accordance with some embodiments, the heat pump utilized in scrubber embodiments may be configured to remove heat from a source of warm air. The source of warm air may include, for example, at least one of a chiller, a compressor, a cooling tower, a generator, a solar heater, and a furnace. The enclosed space may include an HVAC system having circulating airflow in the enclosed space, and the scrubber system, for example, may be configured to intercept a portion of the airflow. The portion may be less than about 20% (for example).

In accordance with some embodiments, an evaporator side of a heat pump may be in thermal communication with circulating, indoor air in some scrubber embodiments. The heat pump may be a heat pump within an HVAC system and the heat pump may include a refrigerant such that a portion of the refrigerant, in its warm state, may be diverted to flow through an element that delivers heat to the purge gas and/or the one or more adsorbent materials. In some embodiments, less than about 50% of the refrigerant flow may be diverted to heat at least one of the purge gas and the one or more adsorbent materials. In some embodiments, less than about 20% of the refrigerant flow may be diverted to heat at least one of the purge gas and the one or more adsorbent materials.

In accordance with some embodiments, a computer implemented method is provided for controlling some scrubber system embodiments, via a control system (e.g., a controller). The method may include controlling delivery of heat by the heat pump to the one or more adsorbent materials in coordination with, for example, the adsorbent materials' regeneration cycle.

In accordance with some embodiments, the method may further include a configuration which controls more than one scrubbing system, and a single, or one or more heat pumps, such that the heat pump(s) may be configured to provide heat to more than one scrubbing systems. The method may further include providing a network of conduits configured for delivering heat from the heat pump(s) to the one or more scrubbing systems. The method may further include providing a control system configured for controlling coordination of the heat pump(s), network of conduits and the one or more scrubbing systems so that regeneration heat may be available to each scrubbing system, for example, when regeneration is required.

In accordance with some embodiments, a control system for one or more scrubbing systems according to some embodiments is provided which may control coordination of at least one of a heat pump(s), network of conduits, and one or more scrubbing systems; as such in some embodiments, such a control system provides control according to at least one of the following parameters:
- an occupancy level of one or more areas in the enclosed space;
- a level of the at least one of gas and/or contaminant contained in indoor air circulating in the one or more areas of the enclosed space;
- a level of the at least one of gas and/or contaminant accumulated in the one or more adsorbent materials;
- a level of the at least one of gas and/or contaminant in air exiting at least one of the more than one scrubbing system;
- an indoor air temperature and/or an indoor air humidity level;
- an outdoor air temperature and/or an outdoor air humidity level;
- and/or a preset schedule.

In accordance with some embodiments, there is provided a scrubbing system including a scrubber for scrubbing an incoming contaminate from a mixture of gases and/or contaminates, thereby removing the contaminate from the mixture of gases. The scrubber may include one or more adsorbent materials, configured to be used repeatedly with an adsorption and/or in-situ regeneration cycle for adsorption of the contaminates by the adsorbent materials and regeneration of the one or more adsorbent materials, and a heat pump system used to elevate the temperature of a purge gas, the purge gas provided to regenerate the one or more adsorbent materials (for example).

In accordance with some embodiments, there is provided a scrubbing system including a scrubber for scrubbing an incoming contaminate from a mixture of gases and/or contaminates, thereby removing the contaminate from the mixture of gases. The scrubber may include one or more adsorbent materials, configured to be used repeatedly with an adsorption and/or in-situ regeneration cycle for adsorption of the contaminates by the one or more adsorbent materials and regeneration of the one or more adsorbent materials, respectively. The system may include a chiller, or an integrated air conditioning unit with a built-in chiller, that uses a refrigerant fluid in a condenser-evaporator loop, and a conduit or pipe configured for carrying warm refrigerant from the chiller to the scrubber to deliver heat to the scrubber during the scrubber regeneration cycle.

In accordance with some embodiments, there is provided a method for treating indoor air within an enclosed space, the method including providing a scrubber for scrubbing an incoming contaminate from a mixture of gases flowing in the indoor air, thereby removing the contaminate from the mixture of gases. The scrubber may include one or more adsorbent materials, configured to be used repeatedly with an adsorption and/or in-situ regeneration cycle for adsorption of the contaminates by the one or more adsorbent materials and/or regeneration of the one or more adsorbent materials. The method may further include elevating the temperature of a purge gas by a heat pump system, for example, where the purge gas may be heated for regenerating the adsorbent materials.

In accordance with some embodiments, there is provided a method for treating indoor air within an enclosed space, the method including providing a scrubber for scrubbing an incoming contaminate from a mixture of gases flowing in the indoor air, thereby removing the contaminate from the mixture of gases. The scrubber may include one or more adsorbent materials, configured to be used repeatedly with an adsorption and/or in-situ regeneration cycle for adsorption of the contaminates by the one or more adsorbent materials and/or regeneration of the one or more adsorbent materials. The method may further include providing a chiller, for example, or an integrated air conditioning unit with a built-in chiller, that uses a refrigerant fluid in a condenser-evaporator loop, and carrying heated refrigerant from the chiller to the scrubber via a conduit or pipe for delivering heat to the scrubber during the scrubber regeneration cycle, for example.

In accordance with some embodiments, there is provided a computer implemented method for scrubbing at least a portion of a mixture of gases of an indoor airflow from an enclosed space, the scrubbing for removing at least one gas and/or contaminant from the mixture of gases and/or contaminants. The method may be carried out via a controller which controls a process for removing the at least one gas and/or contaminant from the mixture of gases and/or contaminates, where the controller is configured to control one or more of: a scrubber system having one or more adsorbent materials, regeneration means configured to regenerate the one or more adsorbent materials, the heating of a purge gas configured at a regeneration temperature to regenerate the one or more adsorbent materials, a heat pump for heating the purge gas to the regeneration temperature. The control may include scrubbing the indoor air by flowing at least a portion of the indoor air over the one or more adsorbent materials, heating the purge gas with the heat pump to the regeneration temperature, and periodically regenerating the one or more adsorbent materials via the regeneration means by, for example, flowing the purge gas over and/or through the one or more adsorbent materials during a regeneration cycle for a predetermined period of time.

BRIEF DESCRIPTION OF THE DRAWINGS

The current subject matter is described with reference to the accompanying drawings. In the drawings, like reference numbers indicate identical or functionally similar elements. Additionally, where applicable, the left-most digit(s) of a reference number identifies the drawing in which the reference number first appears.

DETAILED DESCRIPTION

Figure 1A:
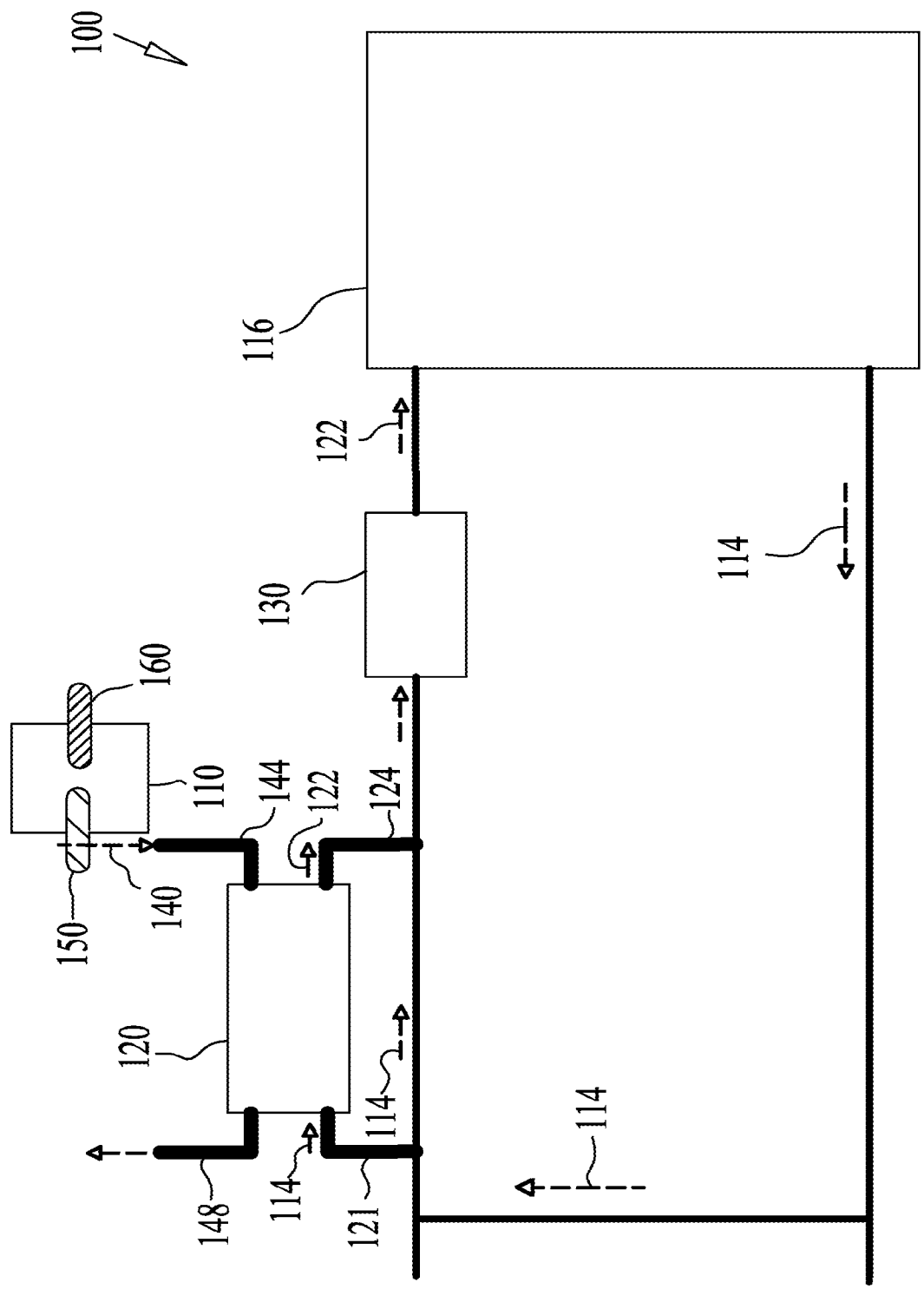
FIG. 1A-1C are each a schematic illustration of an air management system comprising a heating pump according to some embodiments of the present disclosure.

Scrubbing indoor contaminants such as carbon dioxide ($CO_2$), volatile organic compounds (VOCs) and other undesired substances from indoor air can improve indoor air quality in buildings, homes, vehicles and any enclosed space. It can also help achieve better indoor air quality while using less outdoor air ventilation, which in turn can save much of the energy consumption associated with cooling, heating and otherwise conditioning the outdoor air used for such ventilation.

In accordance with some embodiments, an air treatment system may include a scrubbing system. The air treatment system may be provided within an air management system comprising an HVAC system. The scrubbing system may be provided to reduce the concentration of at least one unwanted substance, which may comprise a mixture of gases and/or contaminants present in return air. Return air is typically circulating indoor air from the enclosed space. The scrubbing system may comprise a scrubber for attracting a substance thereto and capturing the substance. Examples of scrubbers are disclosed in applicant's U.S. Pat. No. 8,157,892, which is incorporated herein by reference in its entirety. The scrubbers may comprise any suitable material for capturing undesired substances from the airflowing therein. For example, $CO_2$ can be removed by a scrubber that may comprise an adsorbent material or an adsorbent. In some embodiments, the adsorbent material or adsorbent may include a solid supporting an amine-based compound, such as disclosed in applicant's PCT application PCT/US2012/038343, which is incorporated herein by reference in its entirety.

In accordance with some embodiments, the scrubbers may form a parallel or "bypass" path that takes in a fraction of the total airflow, as will be further described in reference to FIGS. 1A-6 hereinbelow.

Due to the need to treat relatively large volumes of indoor, circulating air for extended periods of time with a finite amount of adsorbent, according to some embodiments, it may be advantageous to continually reuse at least a portion of the same adsorbent by means of an adsorption-regeneration cycle. The regeneration may be performed substantially automatically and mainly in-situ, namely without having to move the adsorbent or parts of the scrubber. Generally, in-situ regeneration may be effected by redirecting airflow, for example, by activating or modifying appropriate dampers or fans or any other suitable means for controlling the airflow.

In accordance with some embodiments, regeneration may be facilitated by heating the adsorbent. There may be provided regeneration means configured to regenerate the adsorbent. The regeneration means may comprise or include a purge gas configured at a regeneration temperature to regenerate the adsorbent; or, in some embodiments, the regeneration means may be at least one of the purging airflow (e.g., at an elevated temperature relative to the adsorbent material), a heat pump (e.g., to provide heat to the purging airflow), and conduits and valves and fans for directing an airflow (e.g., the purging airflow) to/over/through the adsorbent material, and a heat source for heating the purging airflow and/or heating the adsorbent materials (e.g., the heat pump). Thus, the adsorbent can be repeatedly regenerated, for example by flushing it with a flow of warm air or other warm purge gas. In accordance with some embodiments, the regeneration means may comprise heat applied directly to the adsorbent by heating elements or any other suitable structure.

There are many ways to produce the warm purge gas required for regeneration, with minimal expenditure of energy.

According to an embodiment there is described use of several configurations of heat pumps in conjunction with temperature swing adsorption-regeneration systems designed for high energy efficiency applications.

Generally, heat pumps use fluids and compressors in a closed chiller loop of condensation and evaporation, also referred to as a "condenser-evaporator loop", so as to move heat opposite its usual direction, namely removing heat from a lower temperature evaporator region and adding heat to a higher temperature condenser region. In this way a heat pump can act to continuously cool the ambient environment in a cold region (i.e. the evaporator side or cold side) while heating the ambient in a warmer region (the condenser side or warm side). Viewed as a refrigerator or chiller, it enables the cooling of air or water or any fluid below its surrounding temperature; viewed as a heater, it delivers heat where needed, using much less electric power than would be required to produce the same heat with a conventional resistive heater.

The heat pump requires power and consumes energy. Wherein the power used by the heat pump is denoted by W, and the rate of heat removal from the cold side of the heat pump is Q, then the heat delivered at the warm side of the heat pump is approximately Q+W. The ratio of Q to W is the Coefficient of Performance (COP) of the heat pump. For example, wherein the COP is 3, Q=3 W and thus the resultant heat is Q+W=4 W, which is four times more heat than would be delivered using W to produce heat directly, by resistive electrical heating. For minimizing the amount of power used to regenerate the adsorbent, a heat pump represents an efficient use of electric power for producing warm purge gas, compared to other methods, such as resistive heating.

In certain embodiments, the purge gas is outdoor air, which is flushed through the adsorbent with the help of a fan, blower or pump or any other suitable means/structure. The purge gas temperature may be increased by bringing it into direct contact with a heating element, such as a warm coil or radiator of the heat pump for heating the purge gas.

According to some embodiments, the cold side of the heat pump may be exploited for cooling the circulating air prior to reentering the enclosed space, such as a building, thus enhancing the overall economy and effectiveness of the air management system.

Figure 1B:
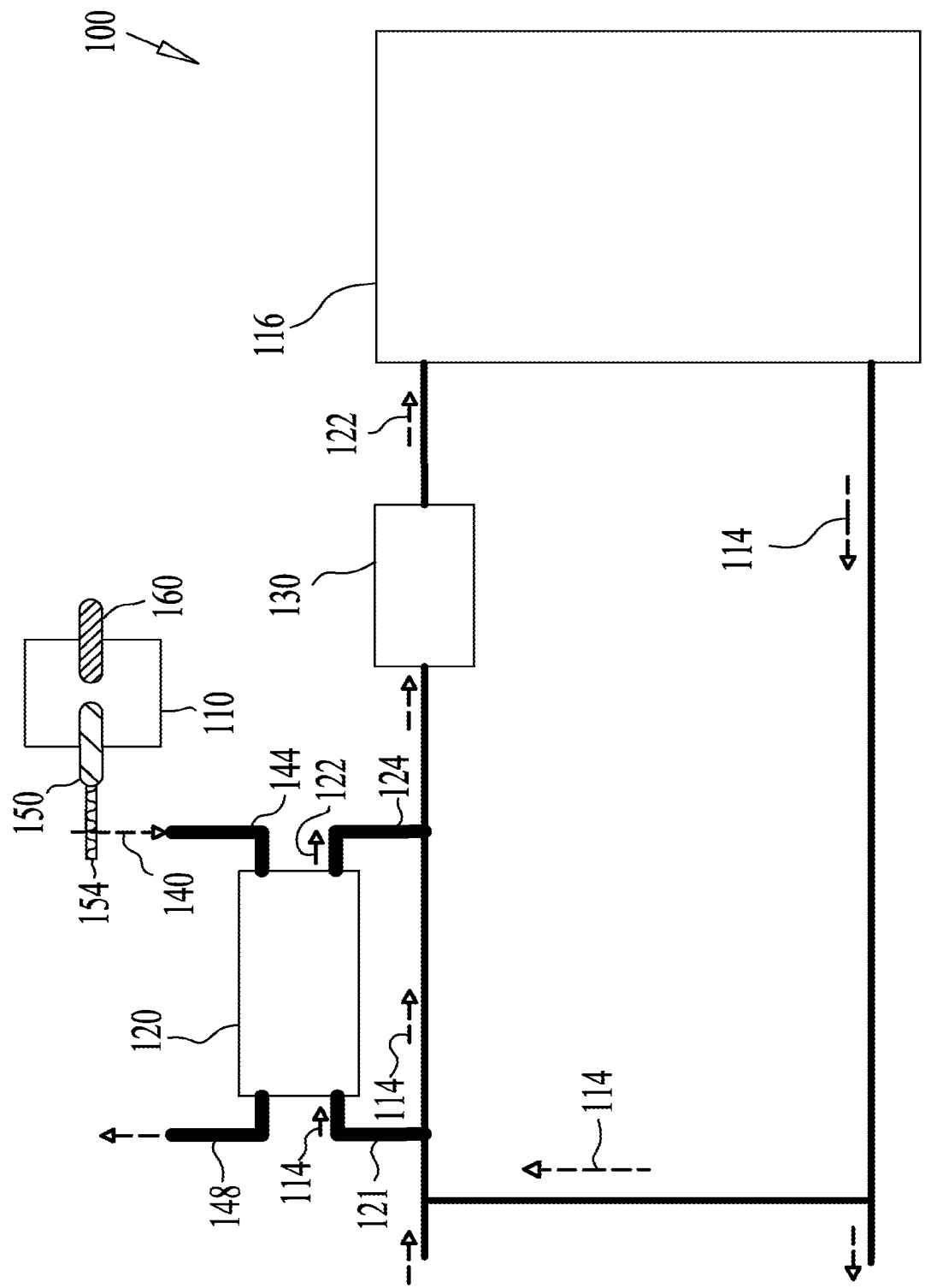
Figure 1C:
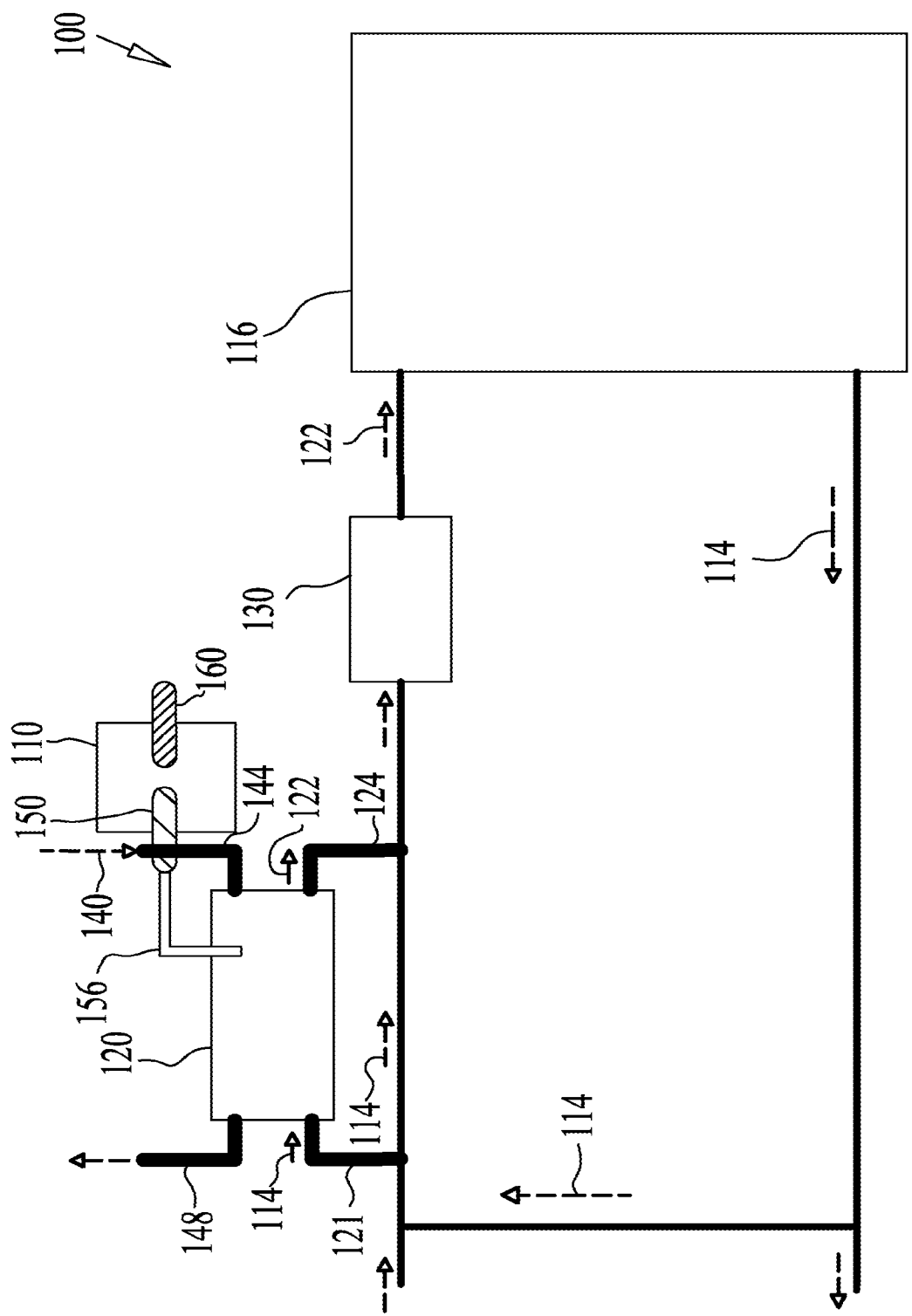

FIGS. 1A-1C are each a schematic illustration of an air management system 100 comprising a heating pump 110 according to some embodiments of the present disclosure. As seen in FIGS. 1A-1C, a stream of circulating air 114 or return air, which is indoor air exiting an enclosed space 116, may circulate through a scrubber 120, via an inlet 121, for removal of contaminants therefrom.

The treated air 122, emerging from scrubber 120, via an outlet 124, may flow back to the enclosed space 116. In some embodiments, the treated air 122 may flow to the enclosed space 116 through an air handling system 130, as shown in FIGS. 1A-1C. In some embodiments, the treated air 122 may flow directly to the enclosed space 116. In some embodiments, a portion of the treated air 122 may flow through the air handling system 130 and a portion may flow directly to the enclosed space 116.

The scrubber 120 may be placed at any suitable location in the air management system 100. In some embodiments, the scrubber 120 may be placed in parallel to the air handling system 130, as shown in FIGS. 1A-1C. In some embodiments, the scrubber 120 may be placed in series with the air handling system 130 (not shown).

The air handling system 130 may be provided for conditioning air prior to entering the enclosed space 116. Conditioning may include, for example, cooling, dehumidification and/or heating.

In accordance with some embodiments, the scrubber 120 may be configured to intercept at least a portion of the received circulating air 114 flowing to the enclosed space 116. In some embodiments, between approximately 1% to approximately 50% of the circulating air may be diverted to the scrubber 120, and a remainder of the circulated air can bypass the scrubber 120. In some embodiments, between approximately 3% to approximately 25% of the circulating air 114 may be diverted to the scrubber 120, and a remainder of the circulating air 114 may bypass the scrubber 120. In some embodiments, between approximately 5% to approximately 15% of the circulating air 114 can be diverted to the scrubber 120, and a remainder of the circulating air 114 can bypass the scrubber 120.

The enclosed space 116 may be an office building; a commercial environment or building; a bank; a residential environment or building; a house; a school; a factory; a hospital; a store; a mall; an indoor entertainment venue; a storage facility; a laboratory; a vehicle; a vessel including an aircraft, a ship, a sea vessel or the cabin of a sea vessel; a bus; a theatre; a partially and/or fully enclosed arena; an education facility; a library; and/or other partially and/or fully enclosed structure and/or facility which can be at times occupied by equipment, materials, live occupants (e.g., humans, animals, synthetic organisms, etc.), etc., and/or any combination thereof. In some embodiments, the enclosed space 116 may have access to outdoor air.

In some embodiments, the adsorbent (not shown) may be placed inside the scrubber 120 and may be configured to capture contaminants from the flowing air. During regeneration, indoor, circulating air 114 may no longer be collected by the scrubber 120 and instead a stream of a purge gas 140 may be introduced into the scrubber 120, via an inlet 144 and expelled via an outlet 148.

In some embodiments, the purge gas 140 may be outdoor air and accordingly the inlet 144 is an outdoor air inlet and receives the outdoor air at an outdoor air temperature. The outlet 148 may be an outdoor air outlet. In order to facilitate the regeneration, heat may be delivered to the purge gas 140 or the adsorbent itself. The heat pump 110 may be configured to deliver heat to the purge gas 140 and/or to the adsorbent. A number of configurations can be implemented affecting the way heat is delivered to the purge gas 140 and/or to the adsorbent and affecting the source of heat drawn by the heat pump 110.

In accordance with some embodiments, such as shown in FIG. 1A, the incoming purge gas 140 may be heated by coming into direct contact with a condenser side 150 of the heat pump 110, and the purge gas 140 may carry the heat to the adsorbent within the scrubber 120.

In accordance with some embodiments, such as shown in FIG. 1B, the incoming purge gas 140 may be heated by coming into contact with a heating element 154, which receives heat from the heat pump 110. The heating element 154 may comprise any suitable element to provide heat such as a coil, for example.

In accordance with some embodiments, such as shown in FIG. 1C, heat may be carried directly to the adsorbent inside the scrubber 120 by one or more conduits or heat conductors 156 that are in thermal contact with the adsorbent and with the condenser side 150 of the heat pump 110. In some embodiments the conduit 156 may be a heat pipe, which is typically configured to carry heat efficiently.

In accordance with some embodiments, the heat pump 110 may be used with its evaporator side 160 in contact with outdoor air, and in essence drawing heat from the outdoor air.

The COP of a heat pump 110 depends, among other things, on the temperature difference between the warm and cold side (namely the condenser side 150 and the evaporator side 160) of the heat pump 110. The heat pump 110 may lose some of its ability to pump heat efficiently as the temperature difference increases. Depending on the adsorbent and some of the system design parameters, in a non-limiting example, the required regeneration temperature can range from as low as 30° C. to well over 100° C. The warmer the surrounding of the cold side 160 of the heat pump 110, the more effective the heat pump 110 may be in elevating the temperature of the purge gas 140 or adsorbent. Typically, when air conditioning is in use within the air management system 100, often outdoor air is fairly warm, lending itself well to this type of heat pump application. For example, the purge gas 140 may be warmer than outdoor air by at least 10° C.

In some embodiments, the purge gas 140, such as the outdoor air, may be heated from the outdoor temperature to the regeneration temperature. The regeneration temperature may be any suitable temperature, typically within a range of approximately 30-120° C. Alternatively, the regeneration temperature may be less than 80° C. Alternatively, the regeneration temperature may be less than 50° C. Alternatively, the purge gas 140 may enter the scrubber 120 at the ambient temperature without prior heating thereof.

The efficiency of heating the purge gas 140 may be improved, such as when outdoor temperatures are not extremely high, wherein warmer air may be delivered to be in contact with the evaporator side 160 of the heat pump 110. An example of a range of such temperatures may be about 30-60° C. If warmer-than-ambient air is available, advantage may be taken of that warm air by causing it to flow in the vicinity of the evaporator side 160 of the heat pump 110.

Figure 2:
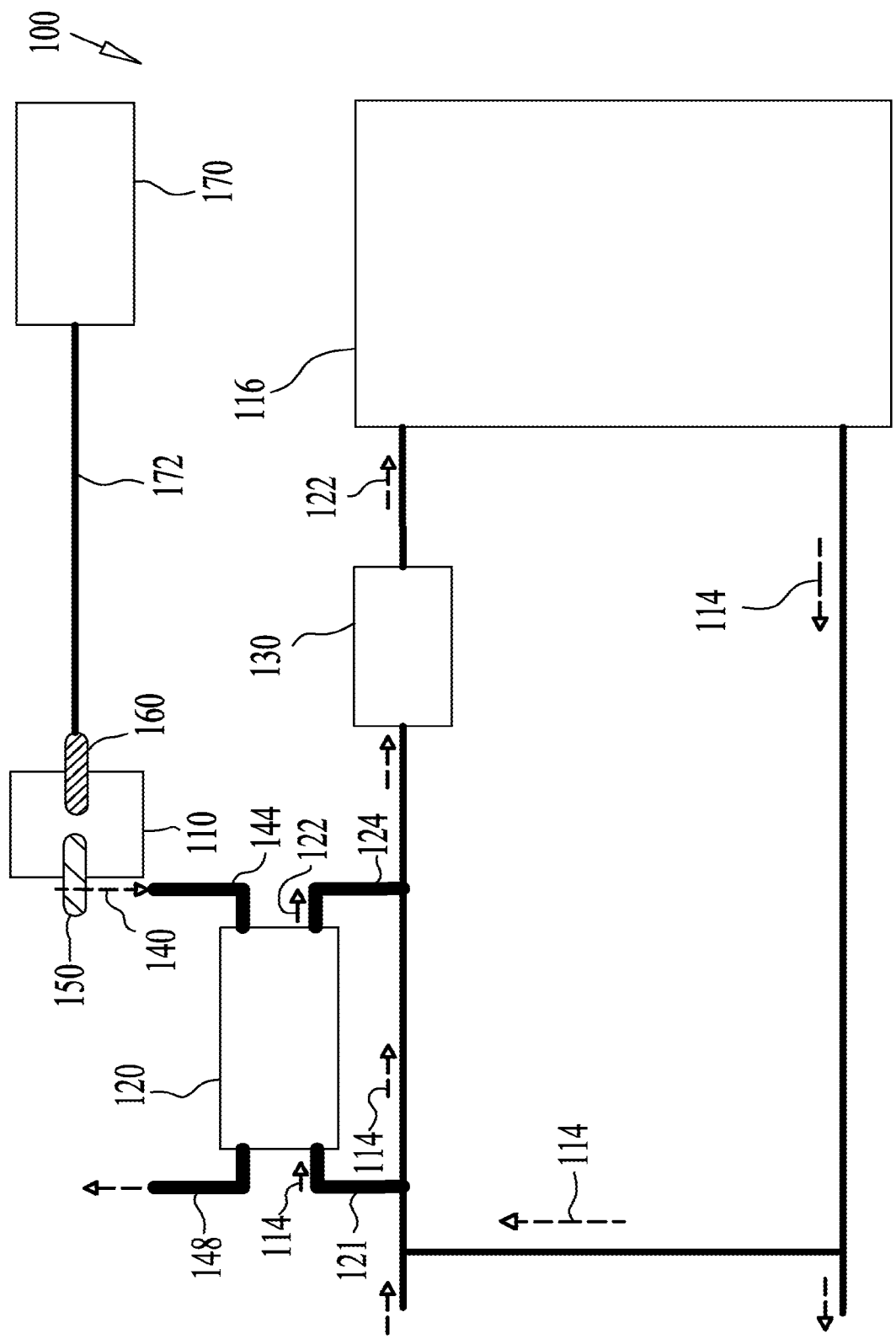
FIG. 2 is a schematic illustration of an air management system comprising a heating pump according to some embodiments of the present disclosure.

FIG. 2 schematically shows how the performance and efficiency of the heat pump 110 can be enhanced by bringing its evaporator side 160 into proximity or thermal contact with warm air, such as might be available in a mechanical room or any number of other sources 170. Compressors, chillers and cooling towers associated with the HVAC system, may produce warm air that can be brought into contact with the evaporator side 160 in a similar fashion.

Furnaces, solar heaters and generators also may be available sources 170 of air that is warmer than the outside temperature. Heat can also be drawn into the heat pump 110 from water or steam available from any number of the sources 170. In some embodiments, the heat pump 110 may draw heat from the hot water in the cooling tower. In another embodiment, building hot water may be used to boost the performance of the heat pump 110.

In some embodiments, the source 170 of heat is not in immediate proximity of the heat pump evaporator side 160, but can be carried to the heat pump 110 via conduits 172 and fans (not shown) or other suitable means/structure.

Figure 3A:
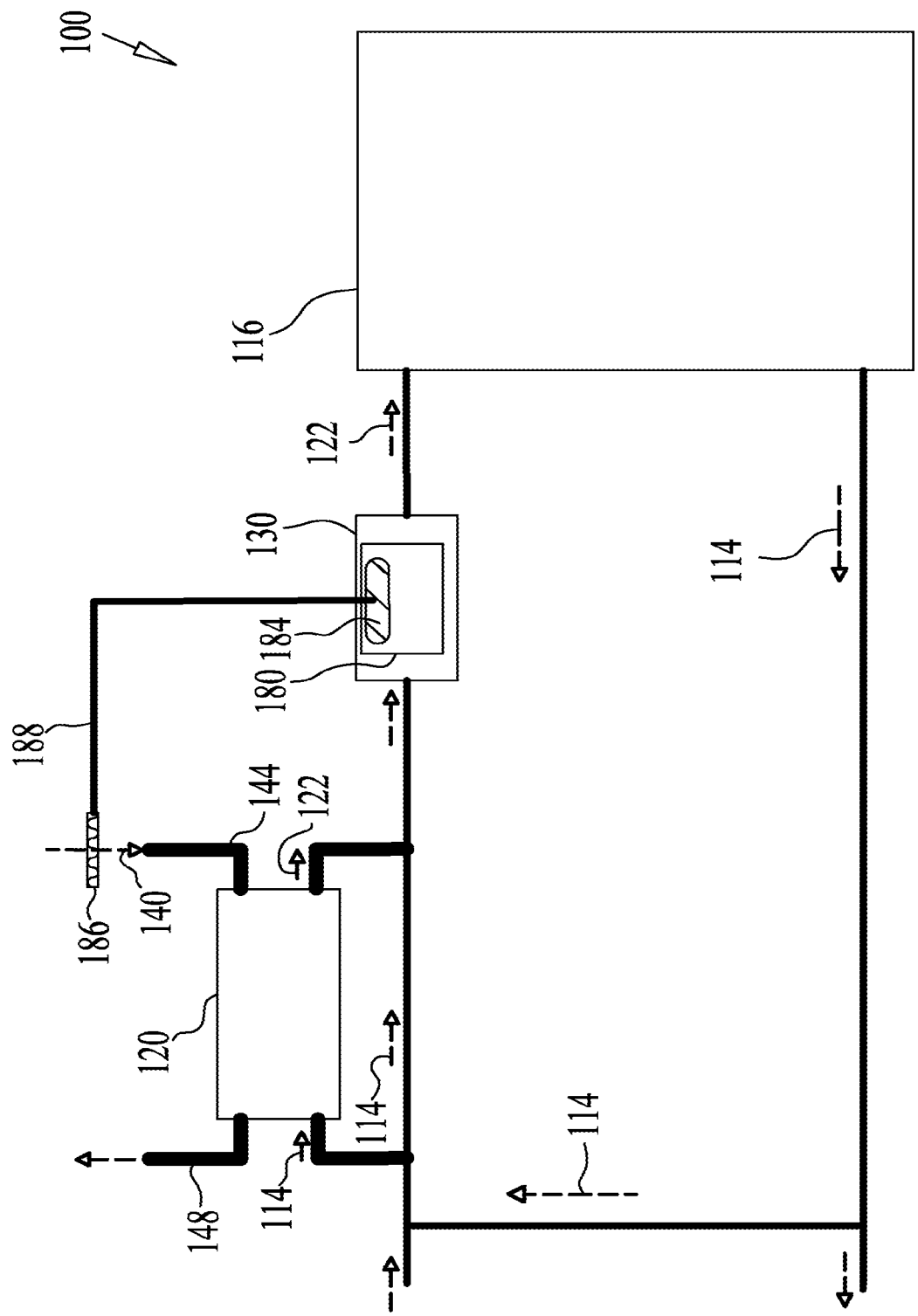
FIGS. 3A and 3B are each a schematic illustration of an air management system comprising a heating pump according to some embodiments of the present disclosure.
Figure 3B:
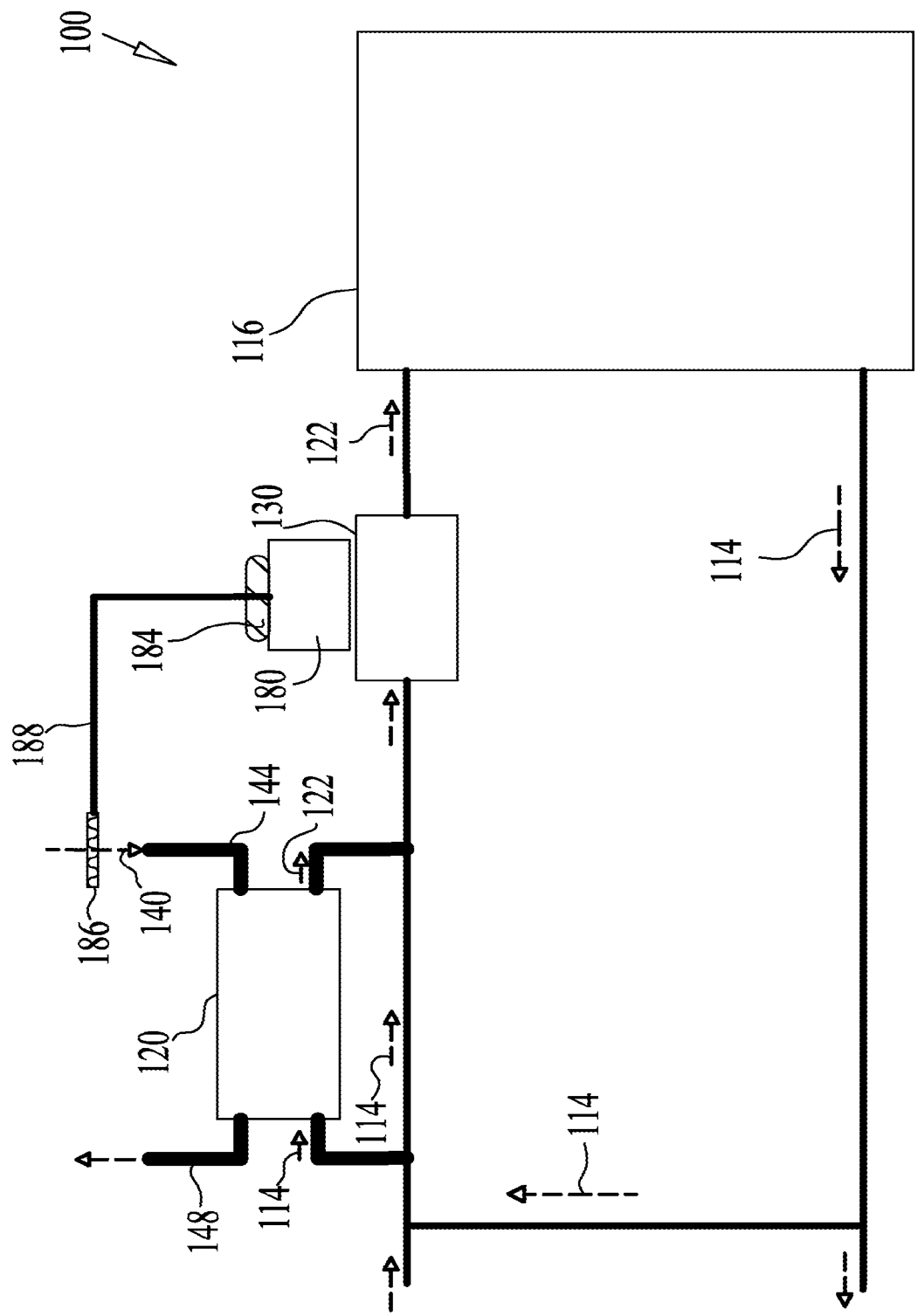

In some embodiments, as shown in FIGS. 3A and 3B, a main heat pump 180, of the HVAC system, can be used, for providing a secondary function as the heat pump for regeneration (in addition to its main role to condition the circulating indoor air). The HVAC system has a compressor based heat pump that, in cooling mode, is used to cool the coils in the air handling system 130. In some embodiments, as shown in FIG. 3A, the main heat pump 180, is integrated with the air handling system 130. In other words, an air-conditioning unit of the HVAC system may be integrated with a built in chiller. This integrated configuration may be referred to as a "packaged unit".

In other embodiments, as shown in FIG. 3B, the chiller may be separate from the air handling system 130 and is in fluid communication therewith. In both embodiments refrigerant fluid may be expanded and cooled in the evaporator side (not shown) and compressed and heated in the condenser side 184. A portion of the hot, compressed refrigerant can be used to deliver heat to the purge gas 140 and/or adsorbent via a coil or any suitable heating element 186 or any other suitable element that delivers heat.

In some embodiments, a special conduit or pipe 188 may be connected to the condenser of the refrigerant loop of the main heat pump 180, allowing a portion of the hot refrigerant to be diverted to the purge gas heating element 186 or to the adsorbent itself, and then allowed to flow back into the refrigerant loop of the main heat pump 180 (not shown). This embodiment can be implemented at the time of manufacturing or as a modification of an existent heat pump or chiller when a scrubber 120 is added to the HVAC system as a retrofit. The portion of the overall refrigerant that is diverted to the scrubber 120 need not be very large. In some embodiments it is substantially less than half of the refrigerant flow. In some embodiments it may be substantially less than 20% of the refrigerant flow. In other embodiments it may be less than 10% of the refrigerant flow. A pump (not shown) may be used to direct the diverted warm fluid towards the scrubber 120.

Figure 4:
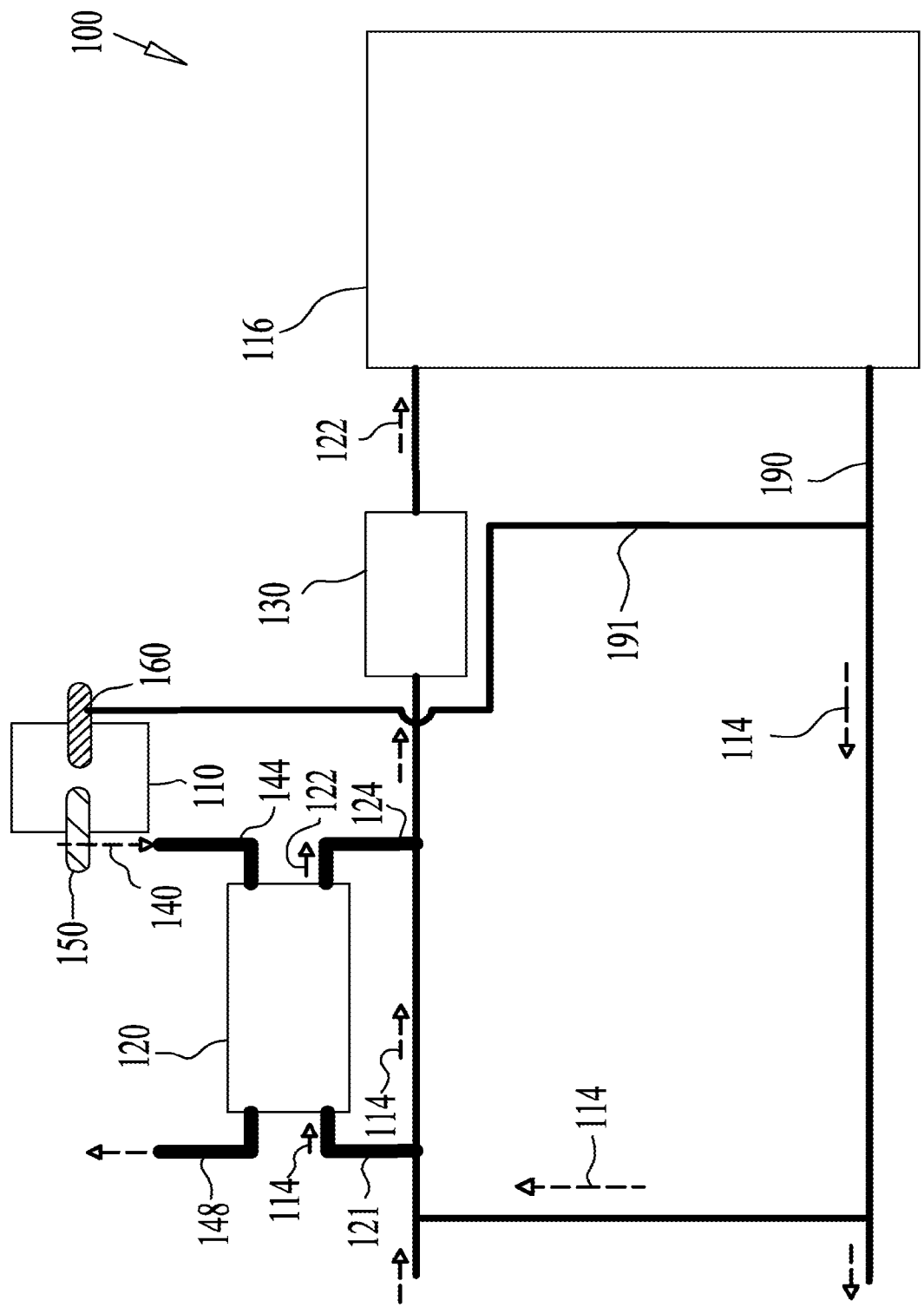
FIG. 4 is a schematic illustration of an air management system comprising a heating pump according to some embodiments of the present disclosure.

In some embodiments, as shown in FIG. 4, a dedicated heat pump 110 may be configured to deliver regeneration heat in the enclosed space 116, typically a building with an HVAC system. The evaporator side 160 of the heat pump 110 may be in direct or indirect contact with circulating indoor air. In some embodiments, as shown in FIG. 4, the evaporator side 160 may be in direct or indirect contact with the circulating air 114 flowing in a return air duct 190 via a duct 191, whether upstream or downstream from the scrubber 120. In some embodiments the evaporator side 160 may be in direct or indirect contact with the circulating indoor air exiting the air handling system 130. In some embodiments the evaporator side 160 may be in direct or indirect contact with the indoor air within the enclosed space 116. Thus the heat pump 110 may be in thermal communication with the circulating indoor air to remove heat therefrom and concurrently heat the purge gas 140 or the adsorbent.

This configuration, where the heat pump 110 may be in direct or indirect contact with circulating indoor air, can improve overall system efficiency. The reason is that as the heat pump 110 may remove heat from the indoor air, it provides the benefit of a commensurate reduction in the heat load on the main chillers, air conditioner units or air handling system 130 serving the enclosed space 116, which in turn translates to energy savings in the chillers, air conditioner units or air handling system 130. If the COP of the scrubber heat pump is similar to that of the main air conditioners, the energy savings of the latter approximately offsets W, the power used by the heat pump 110. Thus the heat pump 110 may be configured to remove heat from circulating indoor air and concurrently heat the purge gas 140. In theory the offset would be exact if the efficiency of the heat pump 110 was the same as the efficiency of the chiller whose cooling load is being offset. In this configuration the purge gas heat pump 110 may be operated with virtually minimal additional overall energy consumption and the heat delivered to the purge gas 140 may be obtained at essentially zero or minimal energy cost.

A heat pump 110 to elevate the temperature of purge gas 140 can be implemented in any type of indoor air scrubbing applications. In some embodiments, the indoor air scrubbing application may include a central air handling unit system, such as a centralized HVAC system, as shown in FIGS. 1A-4. The centralized HVAC system may comprise ducts to circulate indoor air.

Figure 5:
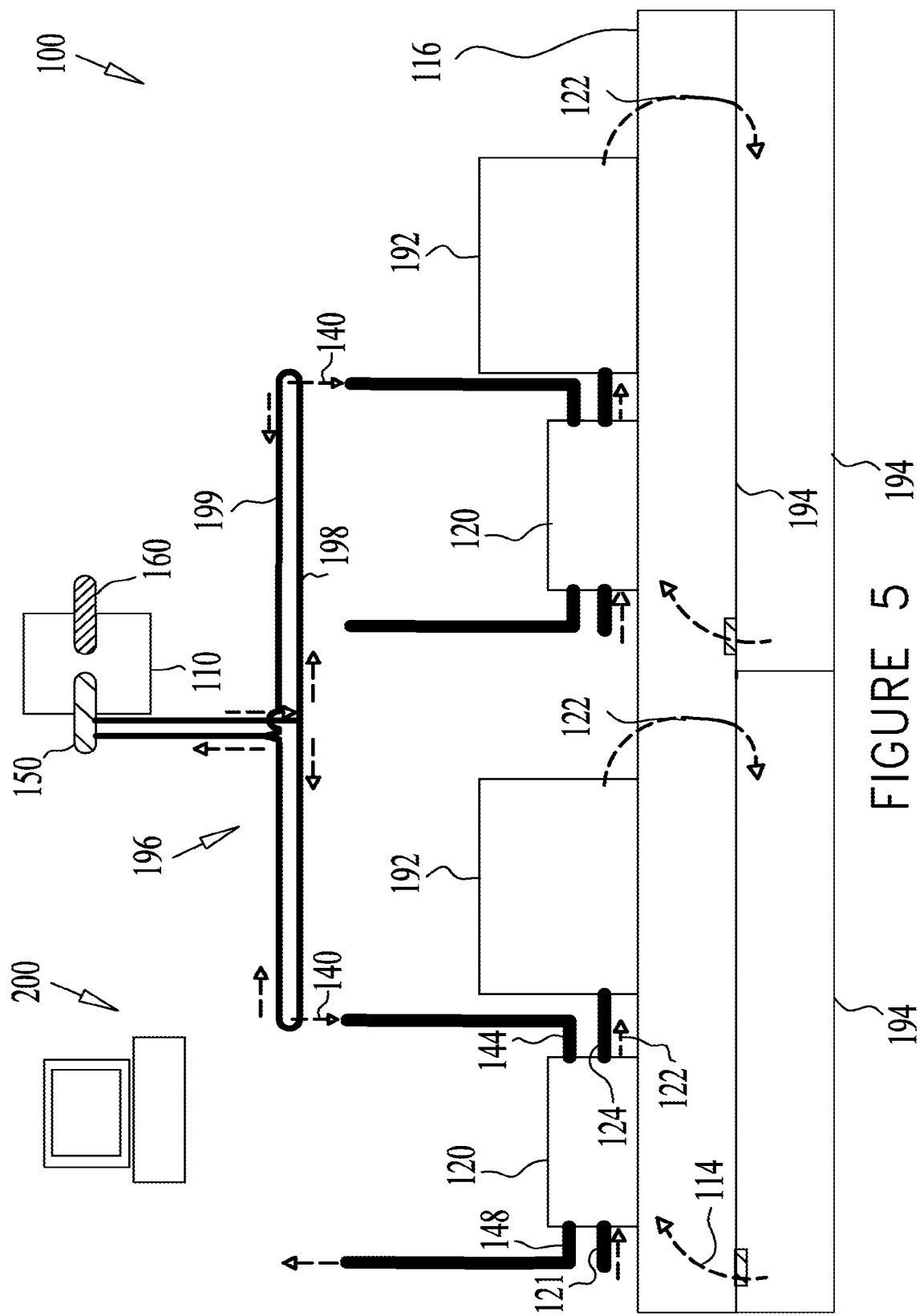
FIG. 5 is a schematic illustration of an air management system comprising a heating pump according to some embodiments of the present disclosure.

In some embodiments, the indoor air scrubbing application may include a fan-coil type system, such as shown in FIG. 5, with generally smaller and/or local air circulation systems 192 in substantially each room or area 194 of the enclosed space 116 or a single local air conditioning unit. The air circulation systems 192 receive at least a portion of the indoor, circulating air 114 for conditioning thereof. The fan-coil type system typically does not comprise ducts to circulate indoor air.

Figure 6:
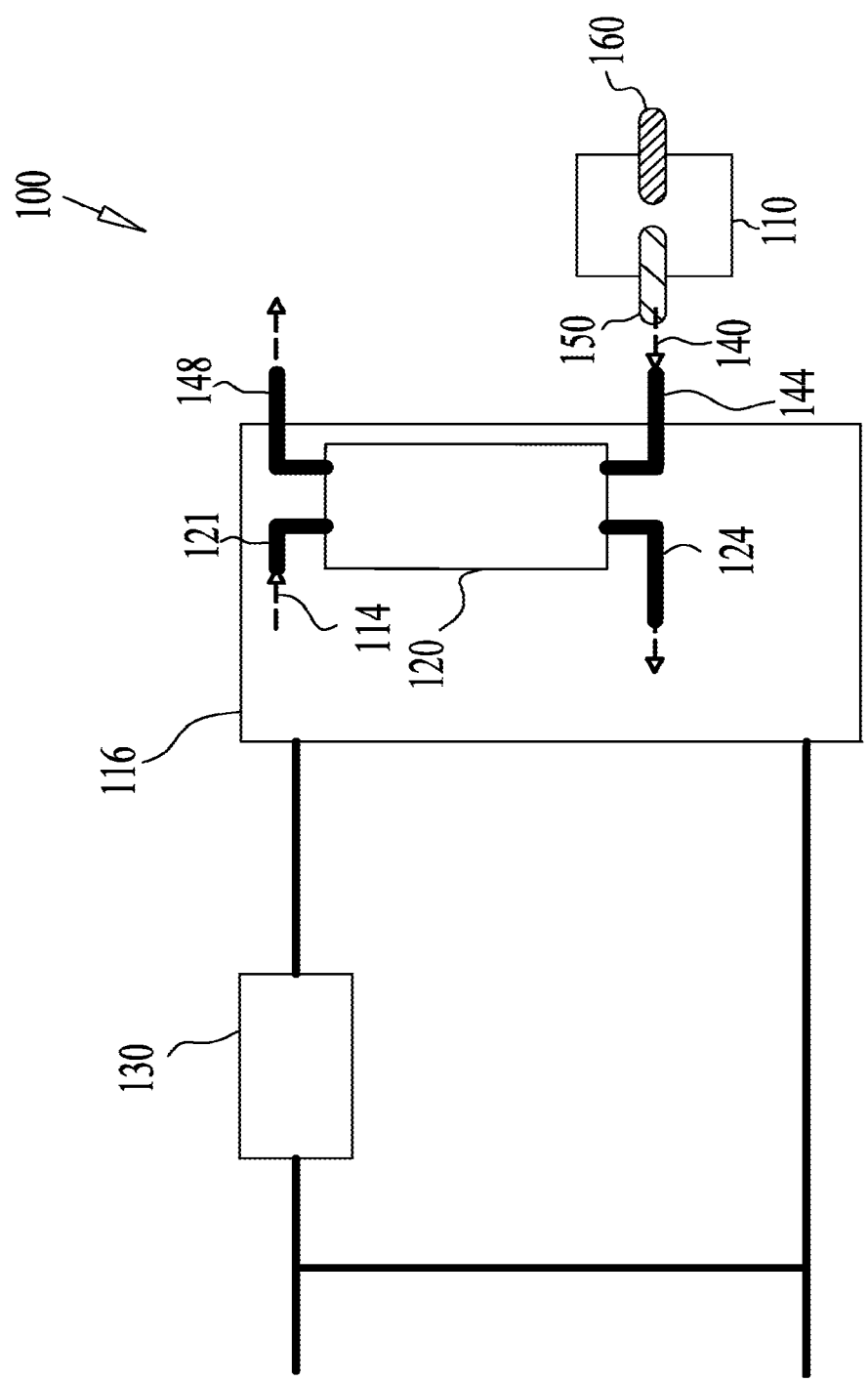
FIG. 6 is a schematic illustration of an air management system comprising a heating pump according to some embodiments of the present disclosure.

In some embodiments, the scrubber 120 may not be attached or related to an HVAC system and can be a stand-alone, independent scrubber, such as shown in FIG. 6. The stand-alone scrubber may comprise the inlet 144 with access to purge gas 140 and the outlet 148 for exhausting the purge gas 140 thereout. In some embodiments, the scrubber 120 may be implemented in applications where there is only ventilation and scrubbing, without HVAC per se.

As described above, in some embodiments, as shown in FIG. 5, there may be a plurality of scrubbers 120, such as relatively small-scale scrubbers 120, distributed in various locations in rooms or areas 194 of the enclosed space 116 or near the enclosed space 116. In some embodiments, these scrubbers 120 may all have adjacent heat pumps 110 to provide regeneration heat. In some embodiments, there could be a single remote heat pump 110 producing heat for regeneration, which heat is delivered from the condenser side 150 to generally each of the scrubbers 120 in the form of heated fluid through appropriate pipes or conduits or network of conduits 196.

The heat may be delivered to the plurality of scrubbers 120 in any suitable manner, such as in any one of the methods described in reference to FIGS. 1A-4.

In some embodiments, a shared heat pump 110 may serve multiple scrubbers 120 more effectively by deliberately timing the adsorption and regeneration cycles of the plurality of scrubbers 120 such that at any given time only a subset of the scrubbers 120 are in regeneration mode and using heat while the others are not. In effect, this is multiplexing of a single heat pump 110 to serve heat to a plurality of scrubbers 120. The heat flow can be managed through the branched fluid network of conduits 196 carrying warm fluid to the scrubbers 120. In some embodiments, the fluid may comprise a liquid that carries heat to each scrubber's inlet 144 for heating the purge gas 140 or the adsorbent via a conduit 198 for delivering the liquid from the heat pump 110 to the multiple scrubbers 120. The liquid may be exhausted or may flow back to the heat pump 110, via return conduits 199. In some embodiments, the fluid may comprise the purge gas 140.

The fluid, flowing in network of conduits 196, may be channeled selectively to the appropriate scrubbers 120 at the appropriate time when each scrubber 120 is undergoing regeneration. The coordination of the regeneration cycles of the multiple scrubbers 120, as well as the shared heat pump 110 and the network that carries fluid or purge gas 140 to each scrubber 120, can be facilitated by a control system 200, such as a central programmable electronic control unit, that activates appropriate valves, dampers, fans, pumps and other elements (not shown). It is noted that the plurality of scrubbers 120 may be in fluid communication with more than one shared heat pump 110.

In some embodiments, the timing of the heat supply to a specific scrubber 120 in a shared heat pump configuration may be determined dynamically based on a number of parameters that include the need of a specific scrubber 120 to commence regeneration as well as a queue of other scrubbers 120 that are ready for regeneration. The scrubbers 120 may differ from each other by the degree in which the different scrubbers 120 require regeneration. The regeneration degree may result from the sorbents' level of saturation as well as the concurrent indoor air quality parameters. In some embodiments the timing of regeneration in a shared network can be based, at least in part, on a present schedule. In some embodiments, selective channeling of heat to the multiple scrubbers 120 and the activation of the heat pump 110 and the multiple scrubbers 120 (i.e. adsorption or regeneration) may be controlled according to at least one of the following parameters: an occupancy level of the enclosed space 116; a level of contaminant contained in indoor air circulating in the enclosed space 116; a calculated level of the contaminant accumulated in the adsorbent; a level of the contaminant in treated air 122 exiting the scrubber after passing through the adsorbent; an indoor air temperature and/or an indoor air humidity level; an outdoor air temperature and/or an outdoor air humidity level; and a preset schedule, which determines the activation of the HVAC system.

It is noted that the control system 200 may be used in the embodiments of FIGS. 1A-6 to control the delivery of heat from the heat pump 110 to the scrubber 120 in coordination with regeneration cycle (e.g., the temperature swing adsorption cycle).

Another embodiment is depicted in FIG. 6. Here a stand-alone scrubber 120 is located inside the enclosed space 116, such as a building, rather than being integrated into the HVAC system. In this embodiment, the air handling system 130 may be included, as shown in FIG. 6, or may be omitted. In the adsorption mode the scrubber 120 may draw in indoor, circulating air 114 from the enclosed space 116 and may send the treated air right back into the same enclosed space 116, thus serving to eliminate unwanted contaminants that are captured by its sorbents. During regeneration, purge gas 140, such as outdoor air, may be brought into the scrubber 120 via the inlet 144 and expelled via outlet 148. The purge gas 140 may be heated by an adjacent heat pump 110 or a heat pump 110 placed in any suitable location. The evaporator side 160 of the heat pump 110 can be used to draw heat from an appropriate source outside the enclosed space 116, such as the ambient environment. Alternatively, the heat pump 110 may draw heat from the enclosed space 116 and thus offer an additional benefit of providing cooling to the enclosed space 116

The heat may be delivered to the scrubber 120 in any suitable manner, such as in any one of the methods described in reference to FIGS. 1A-4.

It is noted in reference to FIGS. 1A-6, that any other suitable means/structure, such as blowers, dampers, valves, fans or shutters, may be used to control the volume of air entering and/or exiting the scrubber 120 or heat pump 110 or any other component of the air management system 100.

In some embodiments, the method for scrubbing at least one gas and/or contaminant, as described in reference to FIGS. 1A-6, may be a computer implemented method, which may be performed by control system 200 (FIG. 5). The method may include configuring the regeneration means at a regeneration temperature to regenerate the adsorbent materials of some of the scrubber system embodiments according to the present disclosure. The method may also include controlling heat pump 110 to heat a purging airflow to the regeneration temperature. The method may further include scrubbing the indoor air by flowing at least a portion of the indoor air over the adsorbent materials and heating a purging airflow with the heat pump 110 to the regeneration temperature. The method may include periodically regenerating the adsorbent materials via the regeneration means by flowing a purging airflow over and/or through the adsorbent materials during a regeneration cycle for a predetermined period of time.

Various implementations of some of embodiments disclosed, in particular at least some of the processes discussed (or portions thereof) for scrubbing, regeneration and the like, and control thereof, may be realized in digital electronic circuitry, integrated circuitry, specially designed ASICs (application specific integrated circuits), computer hardware, firmware, software, and/or combinations thereof. These various implementations, such as associated with the control system 200, for example, may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Such computer programs (also known as programs, software, software applications or code) include machine instructions/code for a programmable processor, for example, and may be implemented in a high-level procedural and/or object-oriented programming language, and/or in assembly/machine language. As used herein, the term "machine-readable medium" refers to any computer program product, apparatus and/or device (e.g., non-transitory mediums including, for example, magnetic discs, optical disks, flash memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a LCD (liquid crystal display) monitor and the like) for displaying information to the user and a keyboard and/or a pointing device (e.g., a mouse or a trackball, touchscreen) by which the user may provide input to the computer. For example, this program can be stored, executed and operated by the dispensing unit, remote control, PC, laptop, smart-phone, media player or personal data assistant ("PDA"). Other kinds of devices may be used to provide for interaction with a user as well. For example, feedback provided to the user may be any form of sensory feedback (e.g., visual feedback, auditory feedback, or tactile feedback), and input from the user may be received in any form, including acoustic, speech, or tactile input.

Certain embodiments of the subject matter described herein may be implemented in a computing system and/or devices that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system according to some such embodiments described above may include clients and servers. A client and server are generally remote from each other and typically interact through a communication network. The relationship of client and server arises by virtue of computer programs running on the respective computers and having a client-server relationship to each other.

Any and all references to publications or other documents, including but not limited to, patents, patent applications, articles, webpages, books, etc., presented anywhere in the present application, are herein incorporated by reference in their entirety.

Example embodiments of devices, systems and methods have been described herein. As may be noted elsewhere, these embodiments have been described for illustrative purposes only and are not limiting. Other embodiments are possible and are supported and enabled by the disclosure, which will be apparent from the teachings contained herein. Thus, the breadth and scope of the disclosure should not be limited by any of the above-described embodiments but should be defined only in accordance with claims supported by the present disclosure and their equivalents. Moreover, embodiments of the subject disclosure may include methods, systems and devices which may further include any elements/features from any other disclosed methods, systems, and devices, including any features corresponding to contaminant scrubbing. In other words, one or more features from one and/or another disclosed embodiment may be interchangeable with one or more features from other disclosed embodiments, which, in turn, correspond to yet further embodiments. Furthermore, one or more features of disclosed embodiments may be removed and still result in patentable subject matter (and thus, resulting in yet more embodiments of the subject disclosure).

What is claimed:

1. A method for removing at least one gas and/or contaminant from a mixture of gases and/or contaminants of an indoor airflow from an enclosed space, comprising:
    providing a scrubber system having one or more adsorbent materials configured for regeneration;
    providing a dedicated heat pump to remove heat from the indoor airflow of an enclosed space;
    scrubbing the indoor air by flowing at least a portion of the indoor air over the one or more adsorbent materials;
    heating a purge gas and/or the one or more adsorbent materials with the removed heat; and
    periodically regenerating the one or more adsorbent materials during a regeneration cycle via at least one of:
        flowing the heated purge gas over and/or through the one or more adsorbent materials, and
        heating the one or more adsorbent materials with the removed heat and flowing the purge gas over and/or through the heated one or more adsorbent materials.

2. The method of claim 1, wherein the at least one gas and/or contaminant of the mixture of gases and/or contaminants are selected from the group consisting of: carbon dioxide, volatile organic compounds, sulfur oxides, radon, nitrous oxides and carbon monoxide.

3. The method of claim 2, wherein the purge gas comprises outdoor air, and wherein:
    the method further includes providing an outdoor air inlet configured to receive the outdoor air at an outdoor air temperature; and
    heating directly and/or indirectly the received outdoor air by the dedicated heat pump to a regeneration temperature for regenerating the one or more adsorbent materials.

4. The method of claim 3, wherein the regeneration temperature is about 10° C. greater than the outdoor air temperature.

5. The method of claim 1, wherein the removing of heat from the indoor air results in a reduction of the cooling load of the enclosed space.

6. The method of claim 5, wherein the reduction of the cooling load of the enclosed space is configured to minimize a difference between an amount of the reduction of the cooling load and an energy consumption of the dedicated heat pump.

7. The method of claim 1, wherein the dedicated heat pump is configured to collect heat from a source of warm air.

8. The method of claim 7, wherein the source of warm air comprises at least one of a chiller, a compressor, a cooling tower, a generator, a solar heater, and a furnace.

9. The method of claim 1, further comprising providing an HVAC system having circulating air flow in the enclosed space, and wherein the scrubber system is configured to intercept a portion of the air flow.

10. The method of claim 9, wherein the portion is less than 20% of a volume of the circulating airflow.

11. The method of claim 1, wherein an evaporator side of the dedicated heat pump is in thermal communication with circulating indoor air.

12. The method of claim 1, wherein an HVAC system provides the dedicated heat pump, and wherein the dedicated heat pump includes a refrigerant configured such that a portion of the refrigerant, in its heated state is diverted to heat to the purge gas and/or the one or more adsorbent materials.

13. The method of claim 12, wherein less than 50% of a volume of the refrigerant flow is diverted to heat at least one of the purge gas and the one or more adsorbent materials.

14. The method of claim 12, wherein less than 20% of a volume of the refrigerant flow is diverted to heat at least one of the purge gas and the one or more adsorbent materials.

15. The method of claim 1, further comprising providing a controller which controls the delivery of heat by the dedicated heat pump to the one or more adsorbent materials in coordination with regeneration of the one or more adsorbent materials.

16. The method of claim 1, further comprising providing a plurality of scrubber systems, and wherein the dedicated heat pump comprises a single heat pump configured to provide heat to the plurality of scrubber systems.

17. The method of claim 16, further comprising providing a network of conduits configured for delivering heat from the dedicated heat pump to the more than one scrubber system.

18. The method of claim 17, further comprising controlling coordination of the dedicated heat pump, network of conduits and the more than one scrubber system so that regeneration heat is available to each scrubber system when it is required for regeneration.

19. The method of claim 18, wherein controlling further includes controlling coordination of at least one of the dedicated heat pump, network of conduits and more than one scrubber, according to at least one of the following parameters:
- an occupancy level of one or more areas in the enclosed space;
- a level of the at least one of gas and/or contaminant in indoor air circulating in the one or more areas of the enclosed space;
- a level of the at least one of gas and/or contaminant accumulated in the one or more adsorbent materials;
- a level of the at least one of gas and/or contaminant in air exiting a least one of the more than one scrubber system;
- an indoor air temperature and/or an indoor air humidity level;
- an outdoor air temperature and/or an outdoor air humidity level; and
- a preset schedule.

* * * * *